J. ALLEN.
Lamp Burner.
No. 81,321. Patented Aug. 25, 1868.
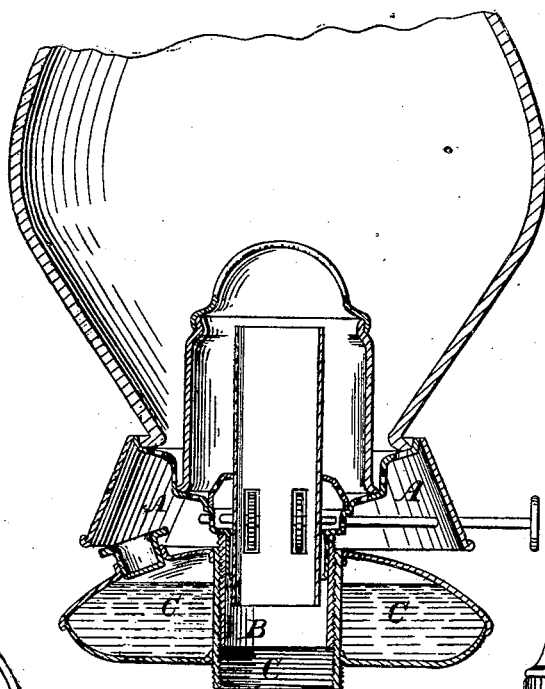
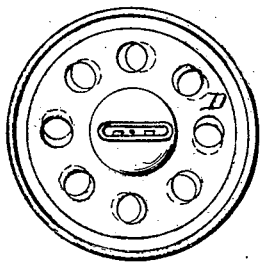
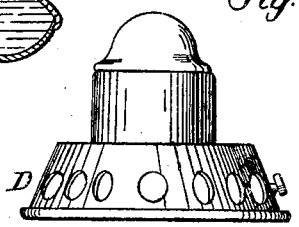
Witnesses.
Chas Sears
Wm C Gould
Inventor.
John Allen

United States Patent Office.

JOHN ALLEN, OF NEW YORK, N. Y.

Letters Patent No. 81,321, dated August 25, 1868; antedated August 12, 1868.

IMPROVEMENT IN LAMP-BURNERS.

The Schedule referred to in these Letters Patent and making part of the same.

TO ALL WHOM IT MAY CONCERN:

Be it known that I, JOHN ALLEN, M. D., of the city, county, and State of New York, have invented a new and useful Improvement in Wick-Burners for Lamps for producing light or heat; and I do declare the following to be a full and exact description thereof, reference being had to the accompanying drawings, and the letters of reference marked thereon.

The nature of my invention consists in attaching to lamps and burners an adjustable draught-regulator, so made as to regulate at pleasure the supply of air to the flame. Different grades of oil require different volumes of air for complete combustion; the air also varies in density, so that a larger volume is required to supply the same quantity of oxygen at one time than at another, or in one climate than in another. Therefore, I construct a draught-regulator, with a view to supplying air to the flame or burner in the proportions required, whether to produce light or heat.

The burners in use are made without reference to these considerations. The air-passages are rigidly of the same dimensions, whatever the grade of oil used, or whatever the climate or density of the atmosphere in which they are used. The supply of air at times is deficient in volume and pressure, and at other times is excessive, and the current, whether too large or too small, is rarely in the right direction. Instead of passing direct to the wick, the air passes to the apertures in the upper part of the cones. These apertures, when too small, confine the heated air within the cones, which do not allow it to escape upward, and consequently it is in part conducted downwards into the lamp and oil, converting the latter into vapor, producing smoke, charred wick, bad odors, and sometimes explosions.

To enable others skilled in the art to make and use my invention, I will proceed to describe its construction and operation.

I do not confine myself to any particular form of construction, as my adjustable draught-regulator may be constructed in several ways, and still produce the desired result, which is to construct a regulator which will completely control the supply of air to the flame, both as to draught and volume.

In constructing my draught-regulator, I make it as a band or collar surrounding the wick-tube, and taper it wider below than above, the chimney resting upon the top of the regulator, and the bottom resting upon the water-chamber or lamp beneath, and when the draught needs to be increased, the regulator is unscrewed to widen the distance between the water-chamber and regulator, and the air rushes in as into a conical air-chamber, and increases the draught and brilliancy of the flame. I also add, if I deem necessary, dampers to open and close around the side or in the bottom of the regulator.

Figure 1 represents the air-regulator A in its position.

Figure 2, a bottom view, showing the valves or dampers D D in the bottom.

Figure 3, dampers D D in the sides of the regulator.

A represents the adjustable draught-regulator attached to the lower part of the burner, and B is an extension of the screw-tube of the burner by which the adjustable draught-regulator is moved up or down. When screwed completely down, it brings the edge of the regulator tightly upon the water-chamber or lamp, and thus prevents all ingress of air, and, by turning the regulator up and down by means of the screw, the air-passages are opened and closed, or the air-space in width is completely regulated. The regulator is attached to this screw B and to the burner, and the screw-tube should project downwards about half an inch. A quarter-of-an-inch movement of the screw is usually found sufficient to control the ingress or egress of air to the burner, and produce perfect combustion, and C is the water-chamber or upper portion of the lamp upon which the adjustable draught-regulator is fixed by means of the extension-screw B.

I do not claim valves or dampers in the bottom or sides of the burner, but

What I do claim as my invention, and desire to secure by Letters Patent, is—

The adjustable draught or air-regulator A, arranged, constructed, and operated on the centre-extension screw B, substantially as described and for the purpose set forth.

JOHN ALLEN.

Witnesses:
  CHAS. SEARS,
  WM. C. GOULD.